United States Patent [19]

Wlodarczyk

[11] Patent Number: 5,535,987
[45] Date of Patent: Jul. 16, 1996

[54] VALVE DIAPHRAGM

[75] Inventor: Anthony M. Wlodarczyk, Redlands, Calif.

[73] Assignee: The Toro Company, Minneapolis, Minn.

[21] Appl. No.: 366,219

[22] Filed: Dec. 29, 1994

[51] Int. Cl.⁶ .................................................. F16K 31/126
[52] U.S. Cl. ............................................ 251/331; 92/98 R
[58] Field of Search .................................. 251/331, 61.1; 92/98 R, 93, 90, 96, 97

[56] References Cited

U.S. PATENT DOCUMENTS 4,717,117  1/1988  Cook .................................. 251/331 X

FOREIGN PATENT DOCUMENTS 510090   9/1952  France .................................. 92/98 R
1196032  7/1965  Germany ............................... 92/98 R Primary Examiner—Kevin Lee
Attorney, Agent, or Firm—James W. Miller

[57] ABSTRACT

A fluid flow control valve has a diaphragm for sealing against a valve seat. The diaphragm has an enlarged resilient annular rim portion which is clamped between mating portions of the valve to seal and support the diaphragm within the valve. The annular rim portion comprises an annular bead that extends substantially completely around a peripheral edge of the diaphragm and is integrally molded with the diaphragm. In addition, a separate flexible ring member having a radially inwardly facing cavity for receiving the bead is separably attached to the bead such that the annular rim portion is formed both by the bead and the ring member.

11 Claims, 1 Drawing Sheet

5,535,987

VALVE DIAPHRAGM

TECHNICAL FIELD

This invention relates to a fluid flow control valve having a resilient diaphragm which closes against a valve seat. More particularly, this invention relates to such a valve having a diaphragm with a compressible, two-part peripheral rim portion for sealing the diaphragm in the valve.

BACKGROUND OF THE INVENTION

Fluid flow control valves are known which use flexible, resilient diaphragms for sealing against a valve seat. The diaphragm flexes away from the valve seat to open the valve and allow fluid to flow between the valve inlet and outlet. Typically, an annular peripheral rim portion of the diaphragm is clamped between two mating portions of the valve to support the diaphragm in the valve. U.S. Pat. No. 4,505,450 to Saarem discloses such a valve in which the rim portion of the diaphragm is clamped between the valve body and a separable cap therefor.

In most valves of this type, including the Saarem valve, the annular rim portion of the diaphragm is tightly compressed to prevent leakage between the diaphragm and the mating valve portions. Saarem uses an open-ended nut which can be screwed down to force the cap against the valve body and thereby compress the rim portion. Other known valves use a plurality of spaced, threaded bolts which extend through the mating valve portions. These bolts can be sufficiently tightened using a wrench to compress the annular rim portion of the diaphragm.

The resilient diaphragms previously used in such valves are typically molded in one-piece from an elastomeric material such as rubber. As the diaphragm diameters expand for larger sized valves, e.g. diaphragms having a 5 inch diameter, the size of the peripheral rim portion needed for adequate sealing often also correspondingly increases. It is difficult to properly mold such larger diaphragms without having deformities or other manufacturing imperfections that occur in the peripheral rim portion. Accordingly, there is a high scrap rate for such diaphragms, which increases the cost of manufacturing such valves.

SUMMARY OF THE INVENTION

Accordingly, it is an aspect of this invention to provide an improved fluid flow control valve of the type having a resilient diaphragm which includes an annular rim portion located at the interface of two mating valve portions. The annular rim portion of the diaphragm is compressible to be sealed between the mating valve portions when the mating valve portions are pressed together at the interface. The improvement relates to the annular rim portion of the diaphragm and comprises an annular rim portion made of two parts releasably secured together.

BRIEF DESCRIPTION OF THE DRAWINGS

This invention will be described in more detail hereafter, when taken in conjunction with the following drawings, in which like reference numerals refer to like elements throughout.

DETAILED DESCRIPTION

Figure 1:
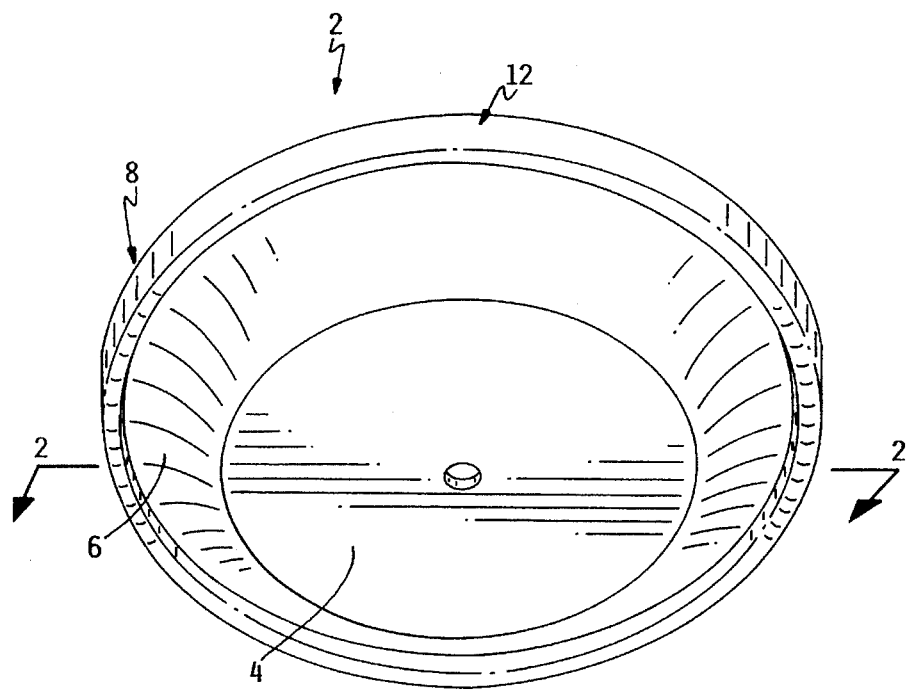
FIG. 1 is a perspective view of an improved valve diaphragm which is to used in the fluid flow control valve of this invention.

By way of background, an improved fluid flow control valve of the type to which this invention relates is well known in the art and need not be specifically shown in the drawings. Such a valve includes a fluid inlet, a fluid outlet, and a generally horizontal valve seat located between the inlet and the outlet. A flexible, resilient diaphragm made of any suitable material, e.g. an elastomeric material such as rubber, is supported in the valve for sealing against the valve seat. The diaphragm has a lower face which engages the valve seat to close the valve, which lower face moves up and off the valve seat to open the valve. A valve of this general type is illustrated in U.S. Pat. No. 4,911,401 to Holcomb et al., assigned to The Toro Company, assignee of this application, which patent is hereby incorporated by reference.

Figure 2:
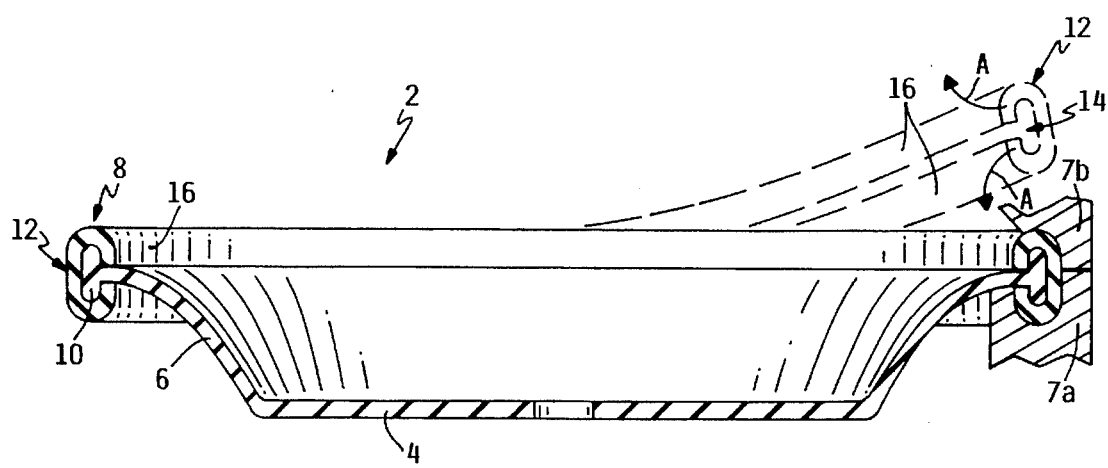
FIG. 2 is an enlarged cross-sectional view of the improved valve diaphragm taken along lines 2—2 in FIG. 1.

This invention relates more specifically to an improved diaphragm 2, as illustrated in FIGS. 1 and 2, for use in a fluid flow control valve of this type. Diaphragm 2 has a planar, lower face 4 for sealing against the valve seat, a cup-shaped body portion 6 that allows the diaphragm to flex or move upwardly to disengage the valve seat, and a peripheral rim portion 8 for sealing the diaphragm at the interface of mating portions 7a and 7b of the valve. In particular, this invention relates to an improved peripheral rim portion 8 which allows diaphragms of this type to be economically manufactured without experiencing a scrap rate nearly as high as prior diaphragms of this type.

More specifically, the peripheral rim portion 8 of the valve comprises two components as follows:

1.) an enlarged annular bead 10 that extends completely and continuously around the peripheral edge of the diaphragm body and is integrally molded with the elastomeric material forming the diaphragm body; and 2.) a separate, molded elastomeric ring member 12 having a radially inwardly facing cavity 14 for receiving bead 10 therein in much in the manner of a Zip-Loc® type sealing connection as used on plastic Zip-Loc® bags.

Thus, ring member 12 can be wrapped around bead 10 and installed thereon to thereby significantly increase the size of bead 10 from that otherwise formed by bead 10 alone.

Ring member 12 is preferably formed from a soft, flexible elastomeric material, preferably the same type of rubber as is otherwise used to form bead 10 and the remaining portions of diaphragm 2. As shown in FIG. 2, cavity 14 is sized to closely receive bead 10 therein, with the cavity 14 being bounded on the radially innermost side by walls or lips 16 that flex or bend outwardly as shown by the arrows A to allow bead 10 to be pushed into cavity 14. Once bead 10 is placed into cavity 14 and is received therein, walls or lips 16 then resume their normal vertical orientation and grip against the radially innermost face or diameter of bead 10 as shown in solid lines in FIG. 2.

To install ring member 12 on bead 10, one would insert bead 10 into ring member 12 at one spot along the circumference thereof. Then, ring member 12 can be pressed down over bead 10 by starting from the one spot that is already secured and working around the circumference of the entire ring member 12 while pressing ring member 12 radially inwardly towards bead 10 to cause bead 10 to slip into cavity 14. When fully installed, ring member 12 completely overlies and is received around bead 10 as shown in solid lines in FIG. 2. The dotted line illustration in FIG. 2 shows ring member 12 partially installed with the dotted line portion of ring member 12 not yet engaged to bead 10.

Forming peripheral rim portion 8 of diaphragm 2 in the disclosed manner has the following advantages. It allows a relatively small bead 10 to be formed on the peripheral edge of the diaphragm body, e.g. a bead significantly smaller than what would normally be required for sealing a diaphragm having a diameter of a particular size. Such a small bead can be formed relatively easily without experiencing a high diaphragm scrap rate, but such a bead may not have enough mass or material to adequately seal diaphragm 2 between the mating portions 7a and 7b of the valve. The additional mass or material needed for such sealing is provided by ring member 12 which is releasably secured to bead 10. This ring member can itself also be inexpensively molded without a high scrap rate, and can be easily attached to bead 10 as disclosed herein.

Thus, peripheral rim portion 8 of diaphragm 2 is formed from two components, namely bead 10 and ring member 12, both of which individually can be inexpensively and reliably molded without unduly high scrap rates. When these two components are then joined together, they provide a diaphragm 2 having a suitably thick peripheral rim portion 8, which diaphragm can be provided without the high diaphragm scrap rates of the past.

Various modifications of this invention will be apparent to those skilled in the art. Thus, the scope of this invention is to be limited only by the appended claims.

I claim:

1. An improved fluid flow control valve of the type having a diaphragm which includes an annular rim portion located at the interface of two mating valve body portions, wherein the annular rim portion of the diaphragm is compressible to be sealed between the mating valve body portions when the mating valve body portions are pressed together at the interface therebetween, wherein the improvement relates to the annular rim portion of the diaphragm which comprises:

an annular rim portion made of:
(a) a first part that is integrally formed with the diaphragm, the first part of the annular rim portion extending both above and below a portion of the diaphragm which is immediately adjacent to the first part such that the first part of the annular rim portion has an enlarged bead-like shape relative to the immediately adjacent diaphragm portion; and
(b) a second part releasably secured to the first part, the second part when secured to the first part substantially covering the bead-like shape of the first part.

2. An improved fluid flow control valve of the type having a resilient diaphragm which includes an annular rim portion located at the interface of two mating valve body portions, wherein the improvement relates to the annular rim portion of the diaphragm which comprises:

an annular rim portion made from:
(a) an annular bead that extends substantially completely around a peripheral edge of the diaphragm and is integrally formed with the diaphragm; and
(b) a separate flexible ring member that forms upper and lower surfaces of the annular rim portion, the ring member being made of a material that is sufficiently compressible to form a seal between the two mating valve body portions, the ring member having a radially inwardly facing cavity for receiving the bead to allow the ring member to be separably attached to the bead such that the annular rim portion is formed both by the bead and the ring member.

3. An improved fluid flow control valve of the type having a diaphragm which includes an annular rim portion located at the interface of two mating valve body portions, wherein the improvement relates to the annular rim portion of the diaphragm which comprises:

an annular rim portion having a first predetermined vertical thickness sufficient to form a seal between the two mating valve body portions, the annular rim portion being made from:
(a) an annular bead that extends substantially completely around a peripheral edge of the diaphragm, the annular bead having a thickness that is greater than a thickness of an immediately adjacent portion of the diaphragm but is less than the first predetermined thickness of the annular rim portion; and
(b) compressible means attached to the bead, the compressible means including an upper layer which covers an upper portion of the bead and a lower layer which covers a lower portion of the bead, wherein the combined thickness of the upper and lower layers of the compressible means and the bead is equal to the first predetermined thickness of the annular rim portion.

4. A valve as set forth in claim 3, wherein the compressible means is releasably attached to the bead.

5. A valve as set forth in claim 3, wherein the compressible means comprises a single ring member that is attached to the bead.

6. A valve as set forth in claim 5, wherein the ring member has a radially inwardly facing cavity for receiving the bead.

7. A valve as set forth in claim 6, wherein the cavity is bounded on a radially innermost side thereof by substantially vertical lips that are flexible relative to the cavity, wherein the lips can flex out of their vertical orientation to allow the bead to be pushed into the cavity with the lips thereafter resuming their vertical orientation to grip against the bead received in the cavity.

8. A valve as set forth in claim 5, wherein the ring member is made of an elastomeric material.

9. A valve as set forth in claim 3, wherein the annular bead is integrally formed with the diaphragm out of the same material used to form the diaphragm.

10. A valve as set forth in claim 9, wherein the annular bead and the diaphragm are both formed of an elastomeric material.

11. A valve as set forth in claim 10, wherein the compressible means comprises a single ring member that is attached to the bead, the ring member also being formed of an elastomeric material.

* * * * *